US010767273B2

(12) United States Patent
Cravens (10) Patent No.: US 10,767,273 B2
(45) Date of Patent: Sep. 8, 2020

(54) METHODS FOR ENHANCED ELECTROLYTIC LOADING OF HYDROGEN

(71) Applicant: IH IP Holdings Limited, St. Helier (JE)

(72) Inventor: Dennis Cravens, Cloudcroft, NM (US)

(73) Assignee: IH IP Holdings Limited, St. Helier (JE)

( * ) Notice: Subject to any disclaimer, the term of this patent is extended or adjusted under 35 U.S.C. 154(b) by 0 days.

(21) Appl. No.: 16/361,825

(22) Filed: Mar. 22, 2019

(65) Prior Publication Data

US 2020/0259166 A1 Aug. 13, 2020

Related U.S. Application Data

(60) Provisional application No. 62/804,989, filed on Feb. 13, 2019.

(51) Int. Cl.
| | |
|---|---|
| *C25B 15/02* | (2006.01) |
| *C25B 1/04* | (2006.01) |
| *C25B 9/04* | (2006.01) |
| *H01M 4/24* | (2006.01) |
| *H01M 4/26* | (2006.01) |
| *G21B 3/00* | (2006.01) |

(52) U.S. Cl.
CPC ............... *C25B 15/02* (2013.01); *C25B 1/04* (2013.01); *C25B 9/04* (2013.01); *H01M 4/242* (2013.01); *H01M 4/26* (2013.01); *G21B 3/00* (2013.01); *G21B 3/002* (2013.01)

(58) Field of Classification Search
CPC .. C25B 1/04; C25B 9/04; C25B 15/02; G21B 3/00; G21B 3/002
See application file for complete search history.

(56) References Cited

U.S. PATENT DOCUMENTS

| | | | | |
|---|---|---|---|---|
| 4,487,670 A | * | 12/1984 | Bellanger | G21F 9/06 205/627 |
| 7,452,449 B2 | * | 11/2008 | Weinberg | C25B 1/02 204/229.4 |
| 2006/0088138 A1 | * | 4/2006 | Jouanneau | G21B 3/00 376/131 |

(Continued)

OTHER PUBLICATIONS

PCT/ International search Report and Written Opinion in International Application No. PCT/US2020/017908 dated May 28, 2020.

*Primary Examiner* — Nicholas A Smith
(74) *Attorney, Agent, or Firm* — NK Patent Law (57) ABSTRACT

An electrolytic method of loading hydrogen into a cathode includes placing the cathode and an anode in an electrochemical reaction vessel filled with a solvent, mixing a DC component and an AC component to produce an electrolytic current, and applying an electrolytic current to the cathode. The DC component includes cycling between: a first voltage applied to the cathode for a first period of time, a second voltage applied to the cathode for a second period of time, wherein the second voltage is higher than the first voltage, and wherein the second period of time is shorter than the first period of time. The AC component has a frequency between about 1 Hz and about 100 kHz. The peak sum of the voltages supplied by the DC component and AC component is higher than the dissociation voltage of the solvent.

23 Claims, 6 Drawing Sheets

(56) References Cited

U.S. PATENT DOCUMENTS

2013/0044847 A1* 2/2013 Steinberg .............. G21B 3/002
  376/151
2017/0323692 A1* 11/2017 Hubler .................... G21B 3/00
2018/0087165 A1* 3/2018 Alcaraz .................. C25B 15/02

* cited by examiner

METHODS FOR ENHANCED ELECTROLYTIC LOADING OF HYDROGEN

CROSS-REFERENCE TO RELATED APPLICATIONS

This application claims the benefit of priority of U.S. provisional patent application No. 62/804,989, titled "METHODS FOR ENHANCED ELECTROLYTIC LOADING OF HYDROGEN," filed on Feb. 13, 2019, which is incorporated herein in its entirety by this reference.

TECHNICAL FIELD

The present disclosure relates to methods of producing heat through electrochemical means. Specifically, the present disclosure relates to the production of heat through electrolytic loading of hydrogen into a cathode.

BACKGROUND

Some electrochemical applications involve the loading of hydrogen or similar species into one or more electrodes. There are three primary competing technologies for the loading of hydrogen into an electrode: "Low High" DC voltage application by Takahashi, the "q wave" method of Brillouin, and the "superwave" forms of Dardik.

Most current methods of electrolytic loading of hydrogen into metals involve slow, steady loading with constant current DC or with a constant voltage. Some systems use pulsed high-low series of DC pulses to aid the process. Shaped AC waves are known in the art, however these still require long, slow loading and do not achieve internal compression of the hydrogen within the metal electrodes. Some experimental and engineering designs require regions of very high hydrogen concentrations to be reached before the desired effects can be achieved or studied. For example, United States Patent Application No. 20070280398 describes a fractal based superwaves technique for hydrogen loading involving the addition of many AC waveforms without DC bias.

The problem with known methods of electrochemical hydrogen loading is that the production of the capacitive double layer around the electrode often limits the loading rates and levels reached in the electrode. Therefore, a protocol that can achieve high regions of hydrogen loading within or upon the surface of electrodes in a shorter time and can continue to produce or maintain high loading levels for extended times is needed.

SUMMARY OF THE INVENTION

The present invention uses the synergistic addition of both Low-High DC stepped switching with a shaped AC superimposed to the DC in the hydrogen loading process. This allows the DC to increase loading during the lower (i.e., less negative) voltage, high current step by taking advantage of the in and out flushing of the hydrogen at the surface utilizing the capacitance nature of the well-known electrochemical double layer formed by the electrolyte near the surface. Additionally, during the higher voltage and lower current DC step, the AC can cause added egress of the hydrogen from the metal and keep diffusion channels open. (For cathode loading the cathode is at a negative potential.) By altering the duty cycle of the DC stepping between the high and low stages, the loading rate during the high voltage step can add more hydrogen than is lost during the low voltage stage. The in and out migration of the hydrogen tends to open up more transport routes and other features that allow much higher levels of loading and faster loading than either DC or AC alone or one following the other in succession independently. The advantage of this synergistic effect is greatly desired in some application.

One of ordinary skill in the art will appreciate that references to hydrogen throughout the specification may refer to all stable isotopes of hydrogen including protium, deuterium, and/or tritium. Likewise, the term water includes its various isotopic forms.

In one embodiment, an electrolytic method of loading hydrogen into a cathode may include placing the cathode and an anode in an electrochemical reaction vessel filled with a solvent, mixing a DC component and an AC component to produce an electrolytic current, and applying the electrolytic current to the cathode. The DC component may include cycling between: a first voltage applied to the cathode for a first period of time, a second voltage applied to the cathode for a second period of time, wherein the second voltage is higher than the first voltage, and wherein the second period of time is shorter than the first period of time. The AC component may have a frequency between about 1 Hz and about 100 kHz. The peak sum of the voltages supplied by the DC component and AC component may be higher than the dissociation voltage of the solvent.

In yet another embodiment, the method may further include performing an initial loading. The initial loading may include mixing an initial DC component and an initial AC component to produce an initial electrolytic current and applying the initial electrolytic current to the cathode. The initial DC component may include cycling between: a third voltage applied to the cathode for a third period of time, a fourth voltage applied to the cathode for a fourth period of time, wherein the fourth voltage is higher than the third voltage, wherein the third period of time and the fourth period of time are approximately the same, and wherein the third voltage is lower than the first voltage and the fourth voltage is lower than the second voltage. The initial AC component may have a frequency between about 1 Hz and about 100 kHz.

In another embodiment, a system for electrolytic loading of hydrogen into a cathode may include an electrochemical reaction vessel filled with a solvent, a cathode and an anode disposed within the electrochemical reaction vessel, and an electrolytic current source connected to the cathode. The electrolytic current may include a DC component, wherein the DC component may cycle between a first voltage applied to the cathode for a first period of time, and a second voltage applied to the cathode for a second period of time, wherein the second voltage may be higher than the first voltage, and wherein the second period of time may be shorter than the first period of time. The electrolytic current may further include an AC component with a frequency between about 1 Hz and about 100 kHz. The peak sum of the voltages supplied by the DC component and AC component may be higher than the dissociation voltage of the solvent.

In yet another embodiment, the method may further comprise sealing the electrochemical reaction vessel.

In yet another embodiment, the method may further include flushing the electrochemical reaction vessel with a reductive gas prior to sealing the electrochemical reaction vessel.

In yet another embodiment, the method may further include applying a magnetic field to the electrochemical reaction vessel.

In yet another embodiment, the frequency of the AC component may be dynamically adjusted.

In yet another embodiment, the DC component and the AC component of the electrolytic current may be mixed with a DC bias.

In yet another embodiment, the cathode may be comprised of at least one of palladium or a palladium alloy.

In yet another embodiment, the cathode may have a hydrogen diffusion rate greater than about 0.1 $cm^3/cm^2/s$.

In yet another embodiment, the cathode may have a hydrogen diffusion rate greater than about 1.4 $cm^3/cm^2/s$.

In yet another embodiment, the solvent may be solutions containing LiOH.

In yet another embodiment, the solvent may be solutions containing LiOD.

BRIEF DESCRIPTION OF THE DRAWINGS

These and other objects, features, and characteristics will become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

DETAILED DESCRIPTION

In the following description, for the purposes of explanation, numerous specific details are set forth in order to provide a thorough understanding of the embodiments of the invention. One skilled in the art will recognize that the embodiments of the invention may be practiced without these specific details or with an equivalent arrangement. In other instances, well-known structures and devices are shown in block diagram form in order to avoid unnecessarily obscuring the embodiments of the invention.

The presently disclosed subject matter is presented with sufficient details to provide an understanding of one or more particular embodiments of broader inventive subject matters. The descriptions expound upon and exemplify particular features of those particular embodiments without limiting the inventive subject matters to the explicitly described embodiments and features. Considerations in view of these descriptions will likely give rise to additional and similar embodiments and features without departing from the scope of the presently disclosed subject matter.

Figure 1:
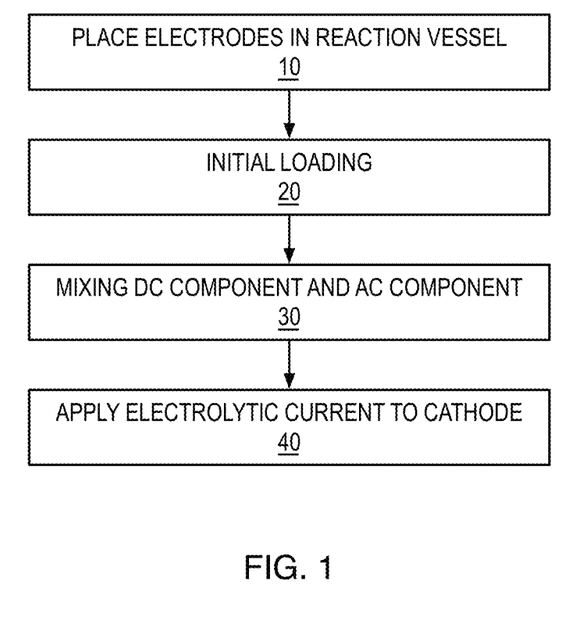
FIG. 1 is a flow diagram of an electrolytic method of loading hydrogen into a cathode according to an embodiment of the present invention.

Referring now to FIG. 1, in one embodiment of the present invention, an electrolytic method of loading hydrogen into a cathode may comprise placing the cathode and an anode in an electrochemical reaction vessel filled with a solvent 10, mixing a DC component and an AC component to produce an electrolytic current 30, and applying an electrolytic current to the cathode 40. The DC component may include cycling between: a first voltage applied to the cathode for a first period of time, a second voltage applied to the cathode for a second period of time, wherein the second voltage is higher than the first voltage, and wherein the second period of time is shorter than the first period of time. The AC component may have a frequency between about 1 Hz and about 100 kHz. The peak sum of the voltages supplied by the DC component and AC component may be higher than the dissociation voltage of the solvent.

DC currents and voltages used here may be switched in time but have a specific polarity above 0 volts as measured by traditional electrochemical methods, i.e. related to uncharged unbounded hydrogen. For clarity, the term DC includes switched DC where the desired voltage remains stable over an extended time. The term AC currents and voltages are used to describe currents which pass through the 0 voltage levels or through the value set by the DC voltages. That is we are using the term relative to the anode of the electrochemical system and AC is meant to be current that alternates between positive and negative charge on the cathode.

It should be clear to those skilled in the art of electrochemistry, that the desired DC biased AC wave forms are applied to electrodes within an electrochemical cell. Specifically, at least the primary current of the DC applied to the cell is polarized so that the electrode (cathode) to receive the hydrogen is negatively charged compared to one of the other electrodes so that hydrogen species are moved toward the cathode.

When the frequency of the AC waveform is discussed it is meant to refer to the Fourier component of that waveform which has the greatest amplitude. It should be realized that the waveform can take a variety of forms. Waveforms having a component with rise-times shorter than 250 ns are preferred.

To avoid confusion, it should be noticed in electrochemical system one electrode is taken as a reference. For this electrolysis system, the anode is taken as the reference and set to ground. The cathode is negatively charge with respect to the anode and to ground.

It is preferred that the DC component's duty cycle be such to have a greater on time for the high voltage or high currents than for the lower ones after the initial loading protocol. This is for the purpose of giving a net ingress of the hydrogen into the electrode. In one embodiment, the cycle timing was 5 minutes with 90% on time for the lower voltage and 10% on time for the higher voltage. (Note: the cathode being loaded is at a negative potential.) In that embodiment, the high voltage was set at 10 VDC and the low voltage at 1 VDC.

In the preferred embodiment, the time between the DC Lo-High cycles (period) should be less than 20 minutes for electrodes with maximum thicknesses of 1 mm. Longer times do not seem to be beneficial for such commonly used materials.

The AC waveform component to the electrolytic current can be of many different functional forms such as sine, square, pulsed, or triangular as commonly available from function generators. Sine waves are used in the description herein but others waveforms can be envisioned by those skilled in the art of electrical engineering. The AC component is added to the stepped cycle DC component for the purpose of causing dynamic movement of the hydrogen into, though, and out of the electrochemical double layer and the surface of the electrode. The sum of the DC and AC components is applied between the electrode to be loaded with hydrogen and another electrode in a manor customary to electrolysis and known within the art of electrochemistry. In the preferred embodiment the addition of the AC and DC components should allow the voltage at the cathode to rise above zero voltage to release hydrogen from the electrode but not, however, to strip the hydrogen completely. Thus the greatest rise of the voltage should be slightly above zero volts but not significantly above zero nor remain at such levels for extended times. It is desired that the cathode be at a negative potential compared to the anode electrode (taken as ground) for longer total times than the positive times. In one embodiment the DC volts where chosen at −10V (90% of the time) and −1.5V (10% of the time) volts and the AC sine amplitude was chosen as 2.5 volts with a frequency of 100 Hz. This results in short-term peak voltages at the cathode to rise to 1 volt. However, the majority of the time the cathode experiences voltages above the dissociation voltage of the water solvent of about 1.5 volts and thus loads hydrogen into the electrode.

Figure 2:
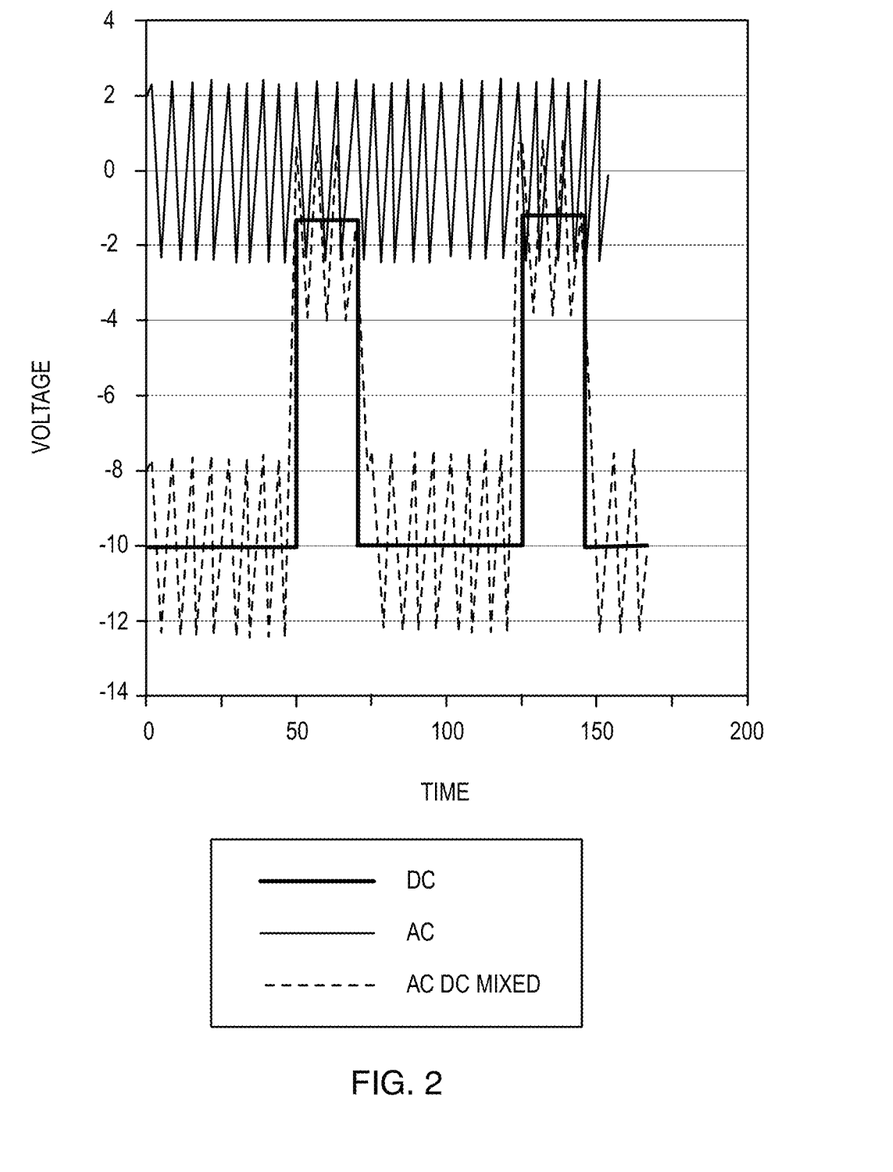
FIG. 2 is a voltage vs. time graph of AC, DC, and AC/DC mixed signals.

Referring now to FIG. 2, deloading can occur when the AC component adds to the DC in such a way to raise it above zero potential. The anode potential is taken as ground or 0 potential. The primary loading occurs during the time the DC component is at a more negative potential. There is a greater current flow when the cathode is at its more negative potentials. In the embodiment illustrated in FIG. 2, the two DC supplies are two DC-DC Adjustable Power Supply Output Step-down Module 6.5V-60V to 1.25-30V 10 A UPC 741870439544. Their purpose is to supply a DC bias to the cathode for loading of hydrogen into the electrode. To that end, it is important that voltages in excess of the dissociation of the solvent (i.e. water) be developed between the two electrodes. For water-basedsolvents, this is around 1.2 to 1.5 V dependent on pressures, electrolyte concentration, isotopic makeup, and temperatures. The two currents are wired to a double pole double throw relay (in one embodiment this was an Enclosed Power Relay, 8 Pin, 24 VDC, DPDT SCHNEIDER ELECTRIC 92S11D22D-24D). The relay was cycled by a repeating unit 12V DC Multifunction Self-lock Relay PLC Cycle Timer Module Delay Time Switch UPC 714046658482. Its function is to activate the relay to cycle between the two DC power supplies. One of ordinary skill in the art would appreciate that any suitable DC supply, controller, and relay may be used in the present invention.

Figure 3:
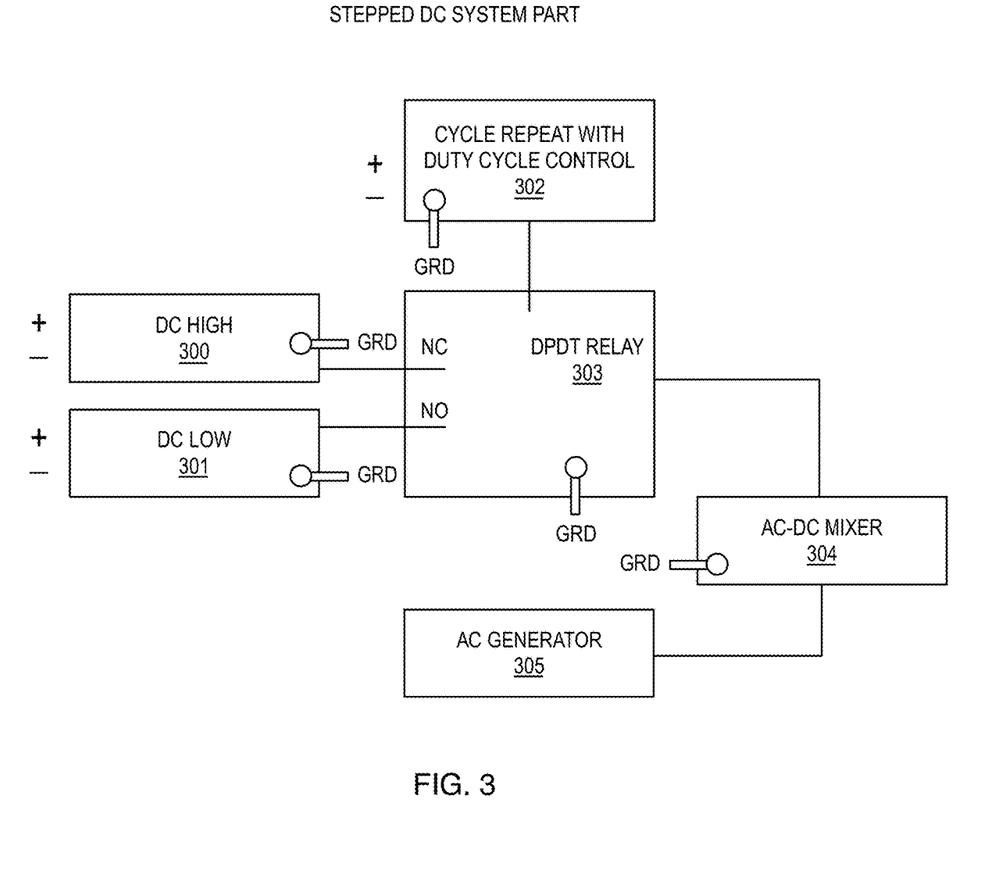
FIG. 3 is a system diagram of a AC/DC mixing according to an embodiment of the present invention.

Referring now to FIG. 3, a general conception of the AC/-DC mixing according to an embodiment of the present invention is shown. It is shown as component units with discrete purposes. The parts' purpose is to supply a cycled DC voltage in a repetitive low-high cycle. It should be obvious by those skilled in the art of electrical engineering that many circuit designs can be employed for the same purpose. For example, a single programmable DC supply could replace the unit or a computer controlled DC supply. Alternatively, a dedicated AC generator which can provide DC Fourier components could be used. However, the separate components of the figure illustrates one embodiment the desired DC part of the input power can be obtained.

As mentioned elsewhere, one supply should be set so that there is net hydrogen-mediated current into the electrode and it should also have a voltage setting so the hydrogen can be dissociated in the solvent. The output of the stepped DC part of the system 303 is then directed to an AC/DC mixing unit 304 for the purpose of adding the two components for supply to the electrodes within the electrochemical system.

Figure 4:
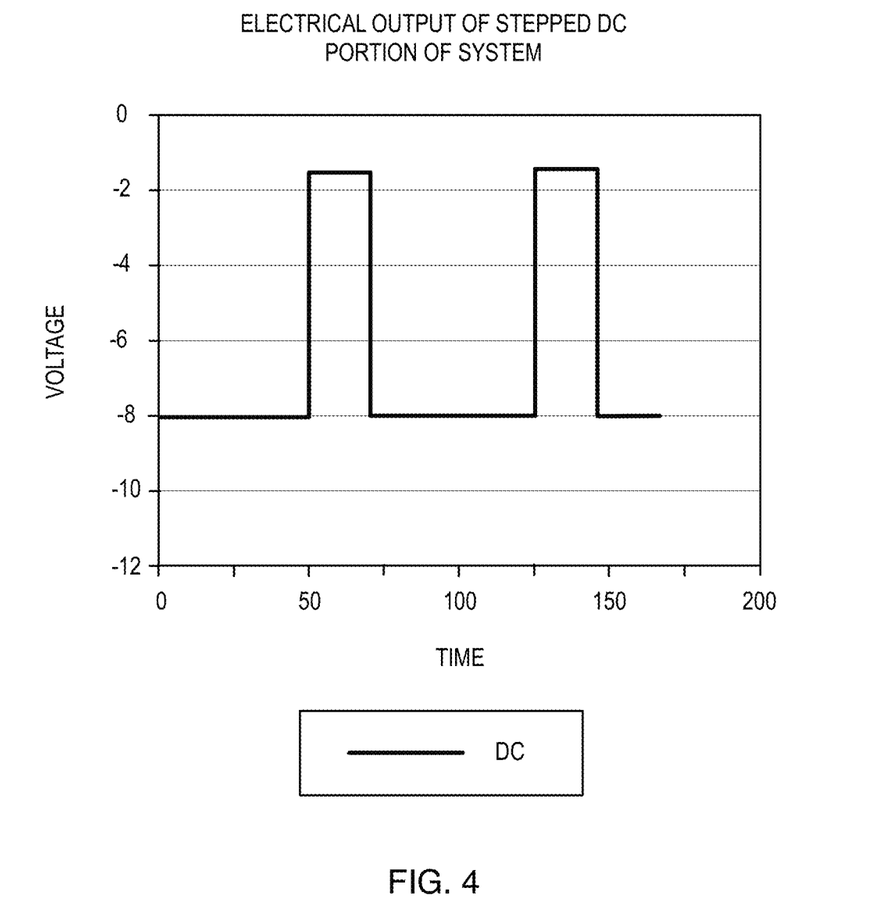
FIG. 4 is a voltage vs. time graph of the stepped-DC portion of a signal according to an embodiment of the present invention.

Referring now to FIG. 4, a voltage vs. time output from the stepped DC portion of the system is shown. The duty cycle provides for the greater potential difference, and hence greater electrochemical current, for longer times than the lesser potential difference between electrodes. Thus, greater time is spent at the larger negative values for the purpose of providing hydrogen to the cathode.

The AC may be supplied by any suitable AC supply 305, for example, a HIGH PRECISION Audio Signal Generator 1 Hz-1 MHz with Sine Triangle Square outputs, UPC 0713893274877 or the like. It should be noted that other frequencies may be used, however, frequencies between 1 Hz and 100 kHz have been observed to be adequate for most applications. The primary factor in setting frequencies is the electrochemical double layer capacitance at the cathode. It is preferred that the expected frequencies range of the specific cell be determined by a method common within the art of electrochemical impedance spectroscopy. That is the primary AC frequency applied should allow for the greatest current flow into the cathode. The output of the AC or functional form device is fed via a current sensor into the AC/DC mixer 304.

In yet another embodiment, the frequency of the AC component 305 may be dynamically adjusted. A current sensor may indicate the absorption of the AC by the electrochemical cell. This, in turn, may signal the transport of the ionic species into, through, and out of the electrochemical double layer and eventually the movement of the hydrogen at the surface or near the surface of the cathode. The AC current sensor may relay the information to a frequency controller whose role is to keep the AC frequency center near the area of maximum AC absorption. Thus it assures a large movement of the hydrogen at the surface and near the surface of the cathode. It is conjectured that this keeps the surface clean and diffusion pathways open. It also shuttles ions through the double layer from the solvent. However, since the cathode experiences outflow of some hydrogen for only short limited times there is net loading of the cathode. It is envisioned that the entire AC part of the system could comprise a single electronic unit.

Figure 5:
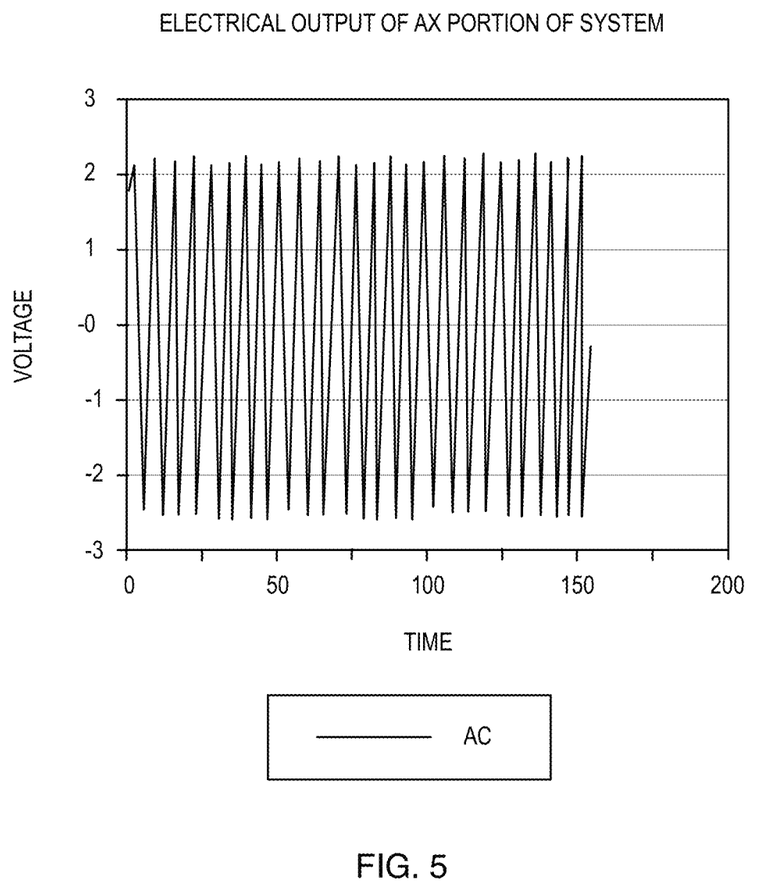
FIG. 5 is a voltage vs. time graph of the AC portion of a signal according to an embodiment of the present invention.

Referring now to FIG. 5, a typical AC output using a simple sine form is shown. Other functional forms are contemplated in the present invention.

In yet another embodiment, the DC component and the AC component of the electrolytic current may be mixed with a DC bias. For enhanced loading of the electrode, the AC or other functional form and the stepped DC current need to be mixed while retaining the DC bias of the output. The goal is to enhance loading by allowing the AC to assist transport through the double layer while fluxing into and out of the metal surface. The DC bias gives a net influx of ions and other species into the cathode. Thus the combination has greater utility than either method alone and greater utility than one following later in time by the other. This synergistic combination is important for the performance of the method and device described herein.

A large number of DC bias AC mixing circuits are known within the art. A typical embodiment is a simple bias Tee circuit designed to pass the AC through a capacitor and the DC through an inductor while blocking the reflection back into the supplies.

Such circuits are well known and component sizes should be selected based on the expected frequency ranges. In one embodiment, the bias tee mixer was constructed using a series of 10 mH inductors and a parallel circuit of Metallized Polyester Film 22 mF Capacitors.

Referring again to FIG. 1, in yet another embodiment, the method may further comprise performing an initial loading 20. The initial loading may comprise applying an initial electrolytic current to the cathode, the initial electrolytic current may include an initial DC component, wherein the initial DC component may include cycling between: a third voltage applied to the cathode for a third period of time, a fourth voltage applied to the cathode for a fourth period of time, wherein the fourth voltage is higher than the third voltage, wherein the third period of time and the fourth period of time are approximately the same, and wherein the third voltage is lower than the first voltage and the fourth voltage is lower than the second voltage. The initial electrolytic current may further include an AC component with a frequency between about 1 Hz and about 100 kHz.

It is preferred that the initial loading of the electrode is conducted at lower temperatures such as below room temperature and that the initial loading is first to be done with low currents and voltages and with the high low DC component duty cycle be near 50%. After 1 hour, the currents can be raised and the duty cycle reduced. This is thought to provide a more gradual loading and avoid some volume expansion distortions due to unequal loading. Once the electrode has been initial loaded and conditioned above 0.6 H/Pd atomic ratios, it can be later be loaded more quickly. Additionally, the duty cycle may be set to 0% after the initial loading protocols and a simple flat DC voltage biased AC can be used with care taken so that the average potential is favorable to retaining loading.

In yet another embodiment, the method may further comprise sealing the electrochemical reaction vessel.

In yet another embodiment, the method may further include flushing the electrochemical reaction vessel with a reductive gas prior to sealing the electrochemical reaction vessel.

In most electrochemical systems, gases are released during operation. Such cells are termed "open" when the system is open for gas exchange to and from the environment and termed "closed" when sealed against such exchanges or have methods to control such exchanges.

In systems designed for hydrogen loading into electrodes, the gas is retained by the electrode and a companion gas such as oxygen from electrolysis is released into the system. This often results in the accumulation of so-called "orphaned oxygen" since there is not enough free hydrogen or reductive species to react with the free oxygen. This is usually detrimental to most thermal energy studies and devices. To that end, it is preferred to first run the system be conducted open or vented to the atmosphere so the orphaned oxygen can leave during the initial loading stages and then be closed later to limit contamination and conserve the electrolyte. In one embodiment this is accomplished by first loading a Pd based cathode run with amp-secs in excess of the time calculated amount that would be required from an estimate based on Faraday's laws of electrolysis of hydrogen needed to fully load the amount of Pd used in said system. In many embodiments, runs were run open longer than ten times the estimated time calculated by Faraday's law. After such time, the cell was sealed or pressure monitored for controlled release or for overpressures leading to higher operating pressures and temperatures. In one embodiment, Pd on $Al_2O_3$ recombination catalyst was used with a cell that was first run open for 4 days and then closed.

The initial running systems open before closing also allows for volatiles to be removed from the solution. This is especially important when trying to load with deuterium from heavy water solutions. Since deuterium oxide (i.e. heavy water) is hygroscopic, solutions often are supplied or become contaminated with the lighter isotope of hydrogen. Light hydrogen is more quickly evolved than the deuterium isotope of hydrogen in electrolytic systems due to its lower voltage required for dissociation. Running open at low voltages and currents preferentially remove the lighter isotope.

One alternative is to flush the gas out of the cell with a reductive species such as hydrogen and then sealed so that any orphaned oxygen will have enough hydrogen to react and be sequestered in the form of water.

In yet another embodiment, the method may further include applying a magnetic field to the electrochemical reaction vessel. In many thermally active electrochemical systems, the magnetic fields are applied for either study of the processes or for adjusting internal spin based reactions. This is especially useful when paramagnetic or ferromagnetic materials are used for one or more electrodes. Hence, in one embodiment, a disc magnet (N42 2×½ Inch Rare Earth Neodymium Disc Magnet from Magnets4Less) was placed beneath the reactive chamber and a second ring magnet (3 OD×2 ID×½ Inch Rare Earth Neodymium Ring Magnet Grade N42 from Magnets4Less). This supplied a field of 300 gauss in the region occupied by the central electrode.

In yet another embodiment, the cathode may be comprised of at least one of palladium or a palladium alloy.

In yet another embodiment, the cathode may have a hydrogen diffusion rate greater than about 0.1 $cm^3/cm^2/s$.

In yet another embodiment, the cathode may have a hydrogen diffusion rate greater than about 1.4 $cm^3/cm^2/s$.

It is recommended that care is performed in selecting metal electrodes for loading of hydrogen. The material should have a hydrogen diffusion rate greater than 0.1 $cm^3/cm^2/s$ and with rates greater than 1.4 $cm^3/cm^2/s$.

The function of the reaction vessel is to provide a relatively inert and structurally stable container for the electrochemical reaction. Such vessels are known to those skilled in the art of chemistry. In one embodiment a Glass Proglass 250 mL Flask fitted with 24/40, 14/20 Two Necks lid and sealed with an Easy Open PTFE Clamp. The central 24/40 neck of the lid is suited to mount a Graham condenser for returning steam from the system back into the vessel. The 14/20 side neck is suited for passing the electrical connections to the electrodes and sensors. One of ordinary skill in the art would understand any other suitable reaction vessel known in the art may be used in the present invention.

In one embodiment, the electrochemical reaction vessel was partially filled with 100 ml of an LiOD 0.1M heavy water based solution. A Pt coated Ti mesh electrode was used as the anode and the cathode was selected as discussed below. The chemical reflux condenser assembly was insulated with vermiculite and cooling water at 30 C was passed down through the condenser (common counter-flow systems in chemistry). This allowed the system to run at boiling temperatures for extended times. This was slightly above 92 C due to the altitude of the inventor's laboratory.

In yet another embodiment, the solvent may be LiOH.

In yet another embodiment, the solvent may be LiOD.

Figure 6:
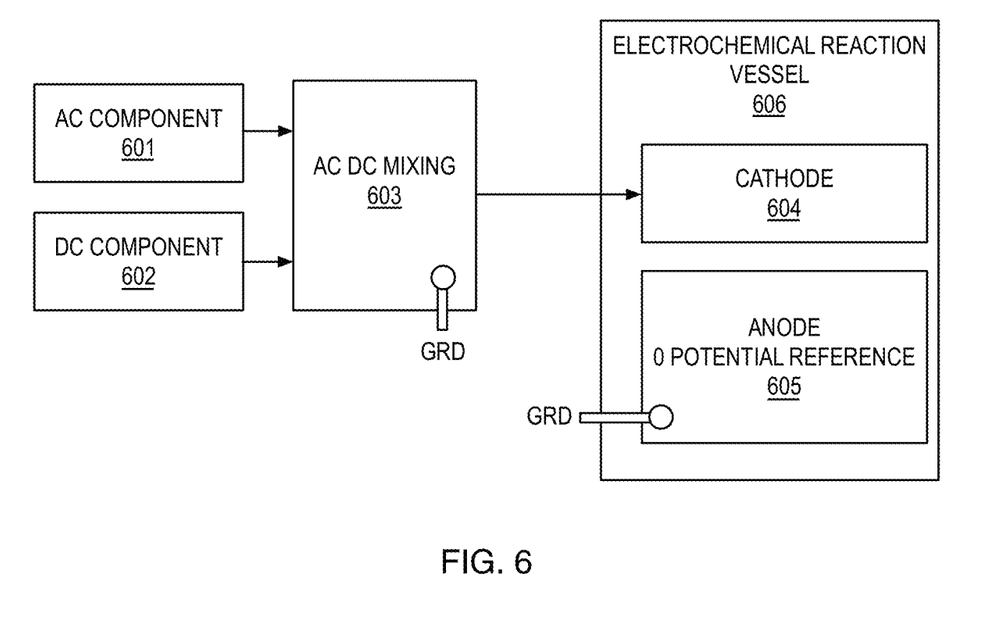
FIG. 6 is a system diagram of a system for electrolytic loading of hydrogen into a cathode according to an embodiment of the present invention.

Referring now to FIG. 6, in another embodiment, a system for electrolytic loading of hydrogen 600 into a cathode 604 may comprise an electrochemical reaction vessel 606 filled with a solvent, a cathode 604 and an anode 605 disposed within the electrochemical reaction vessel 606, and an electrolytic current source 603 connected to the cathode 604. The electrolytic current may comprise a DC component 602, wherein the DC component 602 may cycle between a first voltage applied to the cathode 604 for a first period of time, and a second voltage applied to the cathode 604 for a second period of time, wherein the second voltage may be higher than the first voltage, and wherein the second period of time may be shorter than the first period of time. The electrolytic current may further comprise an AC component 601 with a frequency between about 1 Hz and about 100 kHz. The peak sum of the voltages supplied by the DC component 602 and AC component 601 may be higher than the dissociation voltage of the solvent.

One of ordinary skill in the art will appreciate the system may be used in a manner consistent with the electrolytic methods of loading hydrogen into a cathode as described above and in the example herein.

Example I

The increase loading rate and maximum loading ratios of Hydrogen species into metals is useful in a wide range of utilities. For example, in studies of hydrogen storage materials, hydrogen embrittlement studies, measurements of circuit's resistance and inductance, and even in areas where isotopic hydrogen is studied for thermal release or for tritium storage. To verify the utility of the method, a series of experiments were conducted to compare loading rates by the electrochemical method described herein and with traditional loading for simple DC electrolysis.

Resistance versus time measurements of a palladium wire were made to judge loading rates. Such resistance changes need to be well studied for the case of hydrogen being loading electrochemically into Palladium. The relative resistance, $R/R_0$ (i.e. loaded resistance divided by preloaded resistance), increases by a factor of approximately 1.8 as the H to Pd atomic ratio reaches 0.65 at room temperatures and standard atmospheric pressures. Thus the rate of change of resistance upon loading can be used to evaluate the loading rate and levels. Also when both samples are from the same original wire length, operated under the same environmental conditions, and same amp-seconds of electrolysis, a comparison can be made.

In one embodiment, two 1 foot 95% Pd 5% Ru 28 gauge (AGW) wires were cut from a single piece and were loaded by the two methods described herein for comparison. This was done simply by lowering a loop of each wire into a 0.1M LiOH solution which also contained a platinized Ti mesh electrode commonly used for Pd and Rh electroplating. The resistance of each wire was monitored with respect to time. The resistance was measured by an EXTECH 380560 PRECISION MILLIOHM METER via conventional four wire Kelvin clips placed on the wire ends just above the surface of the solution. The clips were adjusted so the two wires had the same initial resistance of 0.971 ohms. The two wires were run at the same RMS average power levels as measured with a Valhalla Scientific 2100 Digital Power Analyzer. One was run at constant DC current and one at a high DC voltage of 5 volts and a low of 1.75 volts and an AC sine wave at 100 Hz with an amplitude of 3.5 volts peak to peak. The switching between the DC values was set at 5 minutes with a 20% duty cycle.

The resistance maximum was reached at 14.5 hours and indicates a loading of about 0.75 D/Pd ratio. The turn down in the resistance past that time shows continued loading as the phase of the Pd begins to change.

The average rate over the 18 hour run of the competing loading ratios shows that the method described herein is 1.47 higher than DC current alone for the first 18 hours. It is also worth noting that the ultimate loading ratio achieved by this method is higher than the DC alone. For example, after 10 hours, the DC alone loading only achieved a $R/R_0$ level of 1.3 while the method of this invention achieved a level of over 1.5.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms.

Accordingly, the actual scope of the disclosure encompasses not only the disclosed embodiments, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example reference to "an additive" can include a plurality of such additives, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments, +/−10%, in some embodiments +/−5%, in some embodiments +/−1%, in some embodiments +/−0.5%, and in some embodiments, +/−0.1%, from the specified amount, as such variations are appropriate in the disclosed products and methods.

The invention claimed is:

1. An electrolytic method of loading hydrogen into a cathode comprising:
    placing the cathode and an anode in an electrochemical reaction vessel filled with a solvent;
    mixing a DC component and an AC component to produce an electrolytic current such that the electrolytic current comprises a DC biased waveform wherein an AC waveform is superimposed onto a DC waveform;
    applying the electrolytic current to the cathode, wherein a first voltage and a second voltage applied to the cathode relative to the anode that load hydrogen onto the cathode are negative,
        wherein the DC component includes cycling between:
            the first voltage applied to the cathode for a first period of time;
            the second voltage applied to the cathode for a second period time;
            wherein the first voltage is more negative than the second voltage, and
            wherein the second period of time is shorter than the first period of time; and
        wherein the AC component has a frequency between about 1 Hz and about 100 kHz; and
        wherein the peak sum of the voltages supplied by the DC component and AC component is higher than the dissociation voltage of the solvent.

2. The method of claim 1, further comprising:
    performing an initial loading comprising:
        mixing an initial DC component and an initial AC component to produce an initial electrolytic current such that the initial electrolytic current comprises a DC biased waveform wherein an AC waveform is superimposed onto a DC waveform;
        applying the initial electrolytic current to the cathode, wherein a third voltage and a fourth voltage applied to the cathode relative to the anode that load hydrogen onto the cathode are negative, wherein the initial DC component includes cycling between:
the third voltage applied to the cathode for a third period of time;
the fourth voltage applied to the cathode for a fourth period time;
wherein the fourth voltage is higher than the third voltage;
wherein the third period of time and the fourth period of time are approximately the same; and
wherein the third voltage is lower than the first voltage and the fourth voltage is lower than the second voltage; and
wherein the initial AC component has a frequency between about 1 Hz and about 100 kHz.

3. The method of claim 1, further comprising sealing the electrochemical reaction vessel.

4. The method of claim 3, further comprising flushing the electrochemical reaction vessel with a reductive gas prior to sealing the electrochemical vessel.

5. The method of claim 1, further comprising applying a magnetic field to the electrochemical reaction vessel.

6. The method of claim 1, wherein the frequency of the AC component is dynamically adjusted.

7. The method of claim 1, wherein the DC component and AC component of the electrolytic current is mixed with a DC bias.

8. The method of claim 1, wherein the cathode is comprised of at least one of palladium or a palladium alloy.

9. The method of claim 1, wherein the cathode has a hydrogen diffusion rate greater than about 0.1 $cm^3/cm^2/s$.

10. The method of claim 1, wherein the cathode has a hydrogen diffusion rate greater than about 1.4 $cm^3/cm^2/s$.

11. The method of claim 1, wherein the solvent is a solution containing LiOH.

12. The method of claim 1, wherein the solvent is a solution containing LiOD.

13. A system for electrolytic loading of hydrogen into a cathode comprising:
an electrochemical reaction vessel filled with a solvent;
a cathode and an anode disposed within the electrochemical reaction vessel;
an electrolytic current source connected to the cathode, wherein the electrolytic current source is programmed to apply an electrolytic current to the cathode, wherein a first voltage and a second voltage applied to the cathode relative to the anode that load hydrogen onto the cathode are negative, and wherein the electrolytic current comprises:
a DC component, wherein the DC component cycles between:
the first voltage applied to the cathode for a first period of time;
the second voltage applied to the cathode for a second period time;
wherein the first voltage is more negative than the second voltage, and
wherein the second period of time is shorter than the first period of time; and
a AC component with a frequency between about 1 Hz and about 100 kHz;
wherein the peak sum of the voltages supplied by the DC component and AC component is higher than the dissociation voltage of the solvent and
wherein the DC component and the AC component are mixed such that the electrolytic current comprises a DC biased waveform wherein an AC waveform is superimposed onto a DC waveform.

14. The system of claim 13, wherein the electrochemical reaction vessel is sealed.

15. The system of claim 14, wherein the electrochemical reaction vessel is flushed with a reductive gas prior to sealing.

16. The system of claim 13, further comprising a magnetic field applied to the electro chemical reaction vessel.

17. The system of claim 13, wherein the frequency of the AC component is dynamically adjusted.

18. The system of claim 13, further comprising a mixer, wherein the mixer mixes the DC component and AC component of the electrolytic current with a DC bias.

19. The system of claim 13, wherein the cathode is comprised of at least one of palladium or a palladium alloy.

20. The system of claim 13, wherein the cathode has a hydrogen diffusion rate greater than about 0.1 $cm^3/cm^2/s$.

21. The system of claim 13, wherein the cathode has a hydrogen diffusion rate greater than about 1.4 $cm^3/cm^2/s$.

22. The system of claim 13, wherein the solvent is a solution containing LiOH.

23. The system of claim 13, wherein the solvent is a solution containing LiOD.

* * * * *